US005565253A

United States Patent [19]

Crawford et al.

[11] Patent Number: 5,565,253

[45] Date of Patent: Oct. 15, 1996

[54] DISPENSING ASSEMBLY

[75] Inventors: Dennis L. Crawford, Roberts, Wis.; George J. Kluzak, Lake Crystal, Minn.; Jeffrey S. Weinfurter, Troy Township, St. Croix County, Wis.

[73] Assignee: Minnesota Mining And Manufacturing Company, St. Paul, Minn.

[21] Appl. No.: 324,357

[22] Filed: Oct. 17, 1994

[51] Int. Cl.[6] .............................. B32B 1/04; B65H 35/10

[52] U.S. Cl. .............................. 428/68; 221/30; 221/197; 221/282; 225/42; 225/46; 225/47; 225/48; 225/53; 225/90; 206/389; 206/397; 428/76; 428/192; 428/194; 428/352; 428/354; 428/355; 428/906

[58] Field of Search .............................. 428/68, 76, 906, 428/40, 354, 194, 192, 352, 355; 221/30, 197, 282; 225/42, 46, 47, 48, 53, 90; 206/389, 397

[56] References Cited

U.S. PATENT DOCUMENTS

| | | | |
|---|---|---|---|
| 1,907,922 | 5/1933 | Willis | 225/47 |
| 1,920,074 | 7/1933 | Gluck | 225/46 |
| 3,679,146 | 7/1972 | Klitzke | 242/55.53 |
| 4,027,795 | 6/1977 | Rigden | 206/409 |
| 4,779,780 | 10/1988 | Scharf | 225/42 |
| 4,884,826 | 12/1989 | Slagavol | 281/51 |
| 4,889,292 | 12/1989 | Loewe et al. | 242/71.1 |
| 4,980,212 | 12/1990 | Marquis et al. | 428/40 |
| 4,998,656 | 3/1991 | Hurh | 225/47 |
| 5,301,854 | 4/1994 | Scobey | 225/34 |

FOREIGN PATENT DOCUMENTS

| | | |
|---|---|---|
| 384782B | 1/1988 | Austria . |
| 390555B | 5/1990 | Austria . |
| 0502751A2 | 9/1992 | European Pat. Off. . |
| 0613848A2 | 9/1994 | European Pat. Off. . |
| 1149964 | 1/1958 | France . |
| 2547179 | 12/1984 | France . |
| 1381731 | 1/1975 | United Kingdom . |

*Primary Examiner*—Nasser Ahmad
*Attorney, Agent, or Firm*—Gary L. Griswold; Walter N. Kirn; William L. Huebsch

[57] ABSTRACT

A dispensing assembly adapted to be mounted on a backboard that may be supported on an easel or other support structure. The dispensing assembly includes a cylindrical core; a length of sheet material in a roll coaxially around the core; and a molded plastic enclosure including an elongate front portion defining an elongate chamber having an open side, and a rear portion adapted to be mounted on a backboard. The front and rear portions include journal surface portions at their ends that journal projecting end portions of the core with the roll in the chamber, which journal surface portions are separated when the front and rear portions of the closure are separated. Edges of the portions are spaced to define an elongate opening through which lengths of sheet material can be pulled from the roll, and the sheet can be cut against a sharp edge at the opening on the front portion of the enclosure.

11 Claims, 3 Drawing Sheets

DISPENSING ASSEMBLY

TECHNICAL FIELD

The present invention relates to the packaging of large sheet material that can be supported at the front of a room on a support such as an easel during a meeting and used to record lists of items or ideas generated during the meeting.

BACKGROUND ART

Many large pad assemblies are known that include a multiplicity of aligned flexible sheets (i.e., typically paper sheets) in a stack which are attached together along or adjacent aligned edges of the sheets, and include a stiff back card on which the stack is mounted so that the pad assembly can be supported at the front of a room on a support such as a presentation easel during a meeting and used to record lists of items or ideas generated during the meeting. During such use, typically one or more of the uppermost sheets on the pad, after being written on, are either (1) bent or pivoted away from an underlying sheet so that they project over and are supported on an upper support edge of the back card and the underlying sheet can be written on, or (2) are separated from the stack so that the separated sheet or sheets can be positioned elsewhere, typically on the walls of the room to which they are attached by means such as a clip, pin or a length of adhesive coated tape so that information on the separated sheets can easily be viewed by the participants of the meeting.

A pad assembly commercially designated "Clingers" and available from the Ampad Corporation, Holyoke, Md. comprises a multiplicity of flexible sheets disposed in a stack with the corresponding edges of the sheets aligned and with each sheet having a band of repositionable pressure sensitive adhesive coated on its rear surface along aligned first edges of the sheets, and the band of repositionable pressure sensitive adhesive on each sheet adhering it to the front surface of the adjacent sheet in the stack. Sheets removed from the "Clingers" pad assembly can be releasably adhered to a support surface by the bands of repositionable pressure sensitive adhesive on the sheets.

U.S. Pat. No. 5,153,041 discloses a pad assembly including a multiplicity of aligned flexible sheets attached together along one edge portion to form a stack from which any of several uppermost individual sheets can either be pivoted away from an adjacent sheet, or can be separated from the stack and releasably adhered to a support surface by repositionable pressure sensitive on the sheet that can adhere well to many rough surfaces; which pad assemblies can be made large in size and to include a stiff back card whereby they can be supported at the front of a room during a meeting in a generally vertical position and used to record lists of items or ideas generated during the meeting. Preferably, when used as a flip chart, the pad assembly further includes a stiff back card to which the bottom most sheet in the stack is attached. The top portion of the back card can have an elongate opening generally parallel to and spaced from that support edge with the part of the top portion between the opening and that support edge providing a handle by which the pad assembly can easily be moved from place to place. Also, the top portion of the back card can have two aligned parallel elongate through slots positioned adjacent opposite sides of the back card and adapted to receive the support pegs on some types of easels on which the pad assembly might be supported.

U.S. patent application Ser. No. 08/019,158 filed Feb. 16, 1993, describes a relatively compact easily portable dispensing assembly for dispensing lengths of sheet material (e.g., paper) from a roll of sheet material included in the dispensing assembly that can be adapted to be mounted on an end portion of a backboard that may be supported on or included in a presentation easel or other support structure. The sheet material has strips of repositionable pressure sensitive adhesive coated on its rear surface by which the dispensed sheet material can first be removably adhered to the backboard adjacent the dispensing assembly while still attached to the sheet material on the roll to afford writing on the dispensed sheet material, and may subsequently be separated from the sheet material on the roll, removed from the backboard, and removably adhered to another support surface to display the written material. The dispensing assembly described in that application includes the length of sheet material helically wound into a roll with spaced strips of repositionable pressure sensitive adhesive along its rear surface (e.g., longitudinally or transversely extending spaced strips); and an enclosure having a chamber in which the roll of sheet material is rotatably mounted so that lengths of the sheet material from the roll can be pulled from the roll through an opening in the enclosure and cut by pulling the dispensed length of sheet material against a cutting means on the housing. The enclosure of that dispensing assembly can also include means adapted to be releasably attached on one end portion of a conventional backboard with the opening adjacent the other end portion of the backboard. In an embodiment described therein, the dispensing assembly includes a cylindrical core around which the roll is positioned with end portions of the core projecting from end surfaces of the roll. The enclosure includes a front portion comprising elongate walls defining an elongate channel-like part of the front portion that is generally U-shaped in cross section, end walls across the ends of the channel-like part that with the channel like part define the chamber with an open side of the chamber between first and second opposite elongate opposite edges of the channel-like part with the cutting means along its second edge. The enclosure further includes a rear portion including a rear wall, a first edge extending between its opposite ends and defining one side of the opening, an attachment portion adjacent a second opposite edge that includes the means adapted to be releasably attached on one end portion of a conventional backboard, and opposed journal walls having surfaces defining generally central openings adapted to receive and journal the projecting portions of the core. While the enclosure is effective, it is die cut and then folded from corrugated cardboard, which makes it expensive to assemble.

Disclosure of the Invention

The present invention provides an easily assembled relatively compact easily portable dispensing assembly for dispensing lengths of sheet material (e.g., paper) from a roll of sheet material included in the dispensing assembly that can be adapted to be mounted on an end portion of a backboard that may be supported on or included in a presentation easel or other support structure.

The dispensing assembly according to the present invention includes a cylindrical core having an axis; a length of sheet material helically wound into a roll coaxially around that core, the roll having axially spaced end surfaces and the core having opposite projecting end portions projecting axially past those end surfaces; and an enclosure. The enclosure includes a front portion comprising walls defining an elongate channel-like part of the front portion that is generally U-shaped in cross section, has opposite ends and has first and second elongate opposite edges extending between its ends, and end walls across the ends of the channel-like part with those end walls and the channel like part defining a chamber having an open side between the first and second elongate opposite edges of said channel-like part; and a rear portion including a rear wall having opposite ends, opposite first and second edges extending between its ends, and an attachment part adjacent its second edge including means adapted to be releasably mounted on support members on one end portion of a the backboard. The front and rear portions include journal surface portions at each of their ends that are opposed in the closed position of the front and rear portions to define sockets at those ends that receive and journal the projecting end portions of the core with the roll in the chamber. The journal surface portions are separated when the front and rear portions are separated to afford removal of the projecting end portions of the core from between the journal surface portions. The first edges of the walls are spaced to define an elongate opening parallel to the axis through which lengths of sheet material from the roll can be pulled from said roll; and cutting means are provided on the first edge of the front portion along the opening for affording cutting a dispensed length of sheet material projecting through the opening from sheet material on the roll by pulling the dispensed length of sheet material into engagement with those cutting means.

preferably, the front portion of the housing is vacuum formed of transparent polymeric material to afford visually inspecting the amount of sheet material remaining on the roll.

Also, preferably the rear portion is formed of polymeric material, the front portion includes a flange wall around the open side of the channel positioned face to face with said rear wall when the front and rear portions are in their closed position, and the means for removably mounting and releasably retaining the front portion on the rear portion in the closed position and for affording manual removal of the front portion from the rear portion comprises a plurality of projections from said flange frictionally received in sockets in the rear wall.

As is described in U.S. patent application Ser. No. 08/019158, spaced strips of repositionable pressure sensitive adhesive can be positioned on the rear surface of the length of sheet material, and can extend either transversely or along the length of the sheet material.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
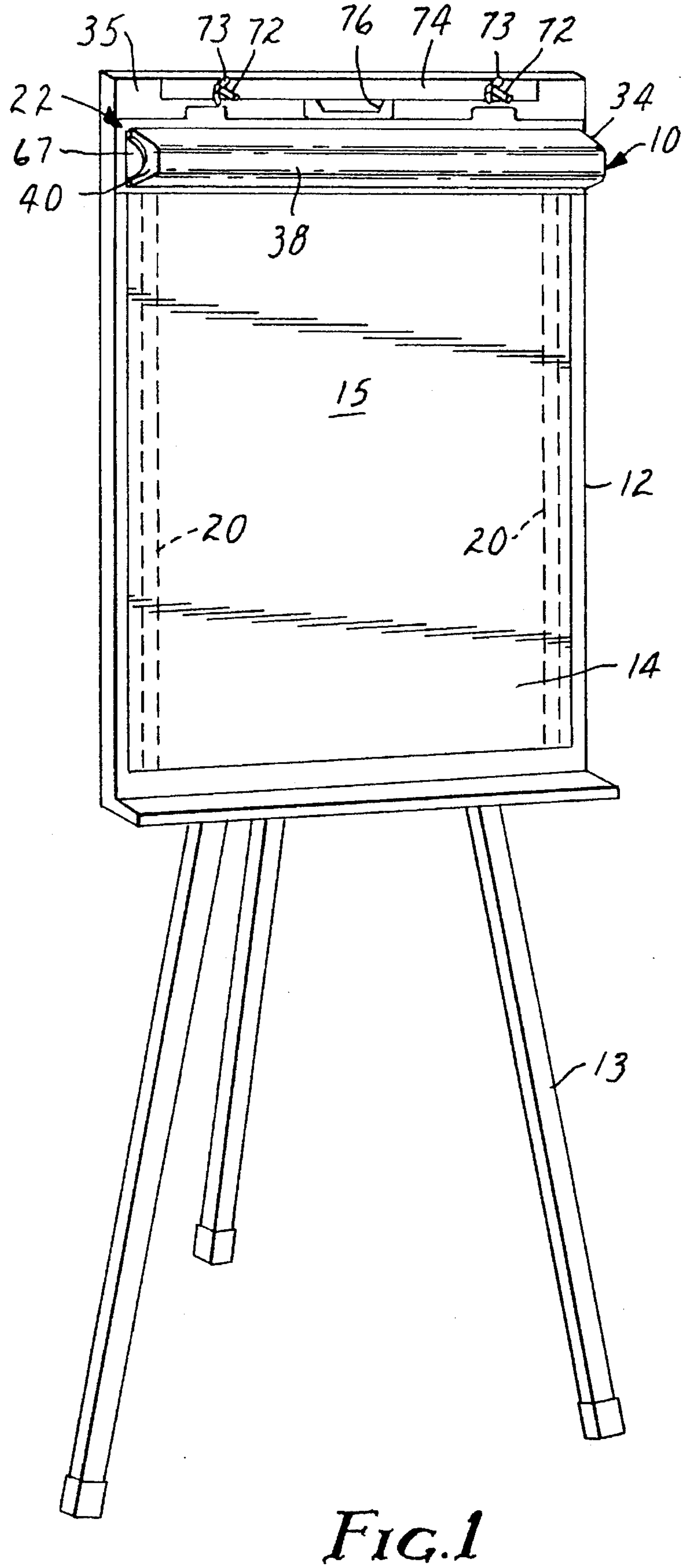
FIG. 1 is a perspective front view of a dispensing assembly according to the present invention shown mounted on a backboard supported by a presentation easel.
Figure 2:
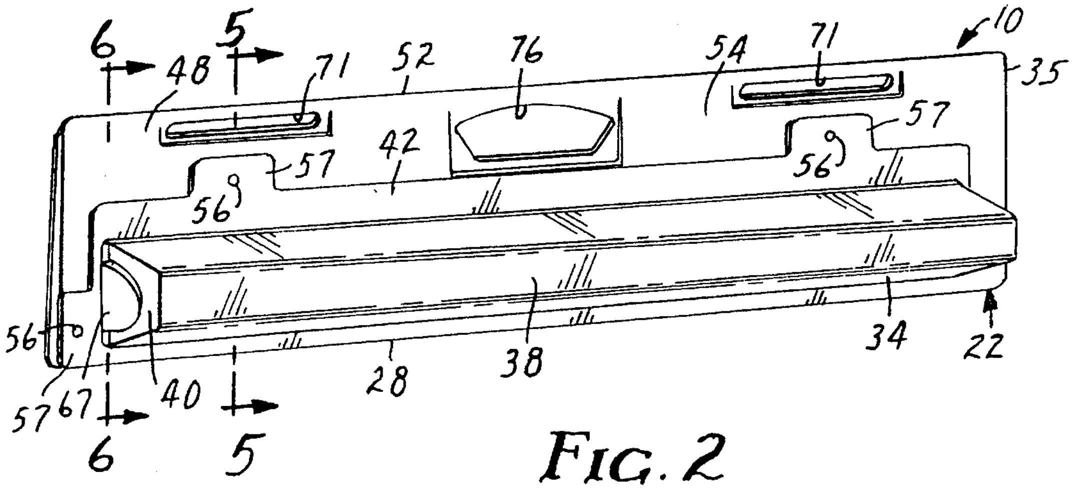
FIG. 2 is an enlarged perspective front view of the dispensing assembly of FIG. 1 removed from the backboard.

Referring now to the drawing, there is illustrated a dispensing assembly according to the present invention that is generally designated by the reference numeral 10. The dispensing assembly 10 is adapted to be mounted on a backboard such the backboard 12 illustrated in FIG. 1 that has opposite end portions and as illustrated is supported on a presentation easel 13, but which could as well be supported on another support structure such as a conference room presentation cabinet.

The dispensing assembly 10 includes a cylindrically tubular core 11 having an axis, and a length of sheet material 14 (e.g., paper) having front and rear surfaces 15 and 16 respectively, which length of sheet material 14 is helically wound into a roll 18 positioned coaxially around the core 11 with its front surface 15 outermost in the roll 18. The core 11 has projecting end portions 17 projecting axially past opposite end surfaces 19 of the roll 18. Two spaced strips 20 of repositionable pressure sensitive adhesive extend longitudinally along the rear surface of the length of sheet material 14, with each strip 20 being closely spaced from a different one of the longitudinal edges of the sheet material 14. The sheet material 14 can be of any suitable width with sheet material 14 at least 45 centimeters or 18 inches wide being useful for many purposes, and paper about 61 centimeters or 24 inches in width being most useful when intended for use on the backboard of conventional presentation easels. Other details concerning the sheet material, coatings, adhesives and adhesive patters that can be used on the sheet material 14 are described in U.S. patent application Ser. No. 08/019,158 filed Feb. 16, 1993, the content whereof is incorporated herein by reference.

The dispensing assembly 10 also includes an enclosure 22 having walls defining a chamber 24, and novel journaling means, later to be explained, mounting the core 11 supporting the roll 18 of sheet material 14 within the chamber 24 for rotation about its axis. Those walls define an elongate opening 26 parallel to the axis of the roll 18 and core 11 through which lengths of the sheet material 14 can be pulled from the roll 18. Cutting means 28 is provided on one of the walls along the opening 26 which affords cutting a dispensed length of the sheet material 14 projecting through the opening 26 from the sheet material 14 on the roll 18 by pulling the end of the dispensed length of sheet material 14 along the cutting means 28 sequentially into engagement with the cutting means 28. Also included in the dispensing assembly 10 are means on the enclosure 22 adapted to be releasably attached or mounted on one end portion of the backboard 12 (i.e., typically on the upper end portion as illustrated in FIG. 1) with the opening 26 adjacent the other end portion of the backboard 12.

The enclosure 22 includes front and rear portions 34 and 35 defining the chamber 24 in which the core 11 supporting the roll 18 of sheet material 14 is journaled. Those front and rear portions 34 and 35 are manually separable so that when the roll 18 of sheet material has all been dispensed, the portions 34 and 35 of enclosure 22 can be separated, the core 11 can be removed, and a new roll 18 of sheet material on a core 11 can be positioned in the chamber 24 of the again assembled enclosure 22.

The front portion 34 of the enclosure 22 is vacuum formed of polymeric material (e.g., 0.060 inch thick sheet styrene)

which preferably is transparent to afford visually inspecting the amount of sheet material 14 remaining on the roll 18. The front portion 34 comprises walls defining an elongate channel-like part 38 of the front portion 34 that is generally U-shaped in cross section, and end walls 40 across the ends of the channel-like part 38. The end walls 40 and the channel-like part 38 define a major part of the chamber 24 that has an open side, and the front portion 34 includes a co-planar flange 42 projecting outwardly from around the open side of the chamber 24. The flange 42 has an elongate edge which is defined by surfaces disposed at about a right angle with respect to each other to provide the cutting means 28 for the sheet material 14.

The rear portion 35 of the enclosure 22 is also vacuum formed of polymeric material (e.g., of 0.060 inch thick sheet styrene). The rear portion 35 comprises a rectangular rear wall 48 having opposite ends, a first edge 50 extending between its opposite ends and defining one side of the opening 26 through which the sheet material 14 is dispensed, a rectangular recess 51 adjacent the front edge defining a minor portion of the chamber 24 in which a portion of the roll 18 is received, an opposite second edge 52, and an attachment portion 54 adjacent the second edge 52 including the means on the enclosure 22 adapted to be releasably attached on one end portion of the backboard 12.

Means for removably mounting and releasably retaining the front portion 34 on the rear portion 35 in a closed position while affording manual removal of the front portion 34 from the rear portion 35 comprises a plurality of hollow cylindrical projections 56 projecting normally from spaced tab-like portions 57 of the flange 42, which projections 56 are adapted to be frictionally and removably received in mating sockets 59 in the rear wall 48. Also, the rear wall 48 has an upwardly projecting rim 60 around three sides of the recess 52 (i.e., all sides but the side adjacent the opening 26). That rim 60 is adapted to fit closely within a mating recess around the front portion 34 where the flange 42 joins the channel like part 38 and the end walls 40 to help align the front and rear portions 34 and 35 when they are in their closed position.

Figure 6:
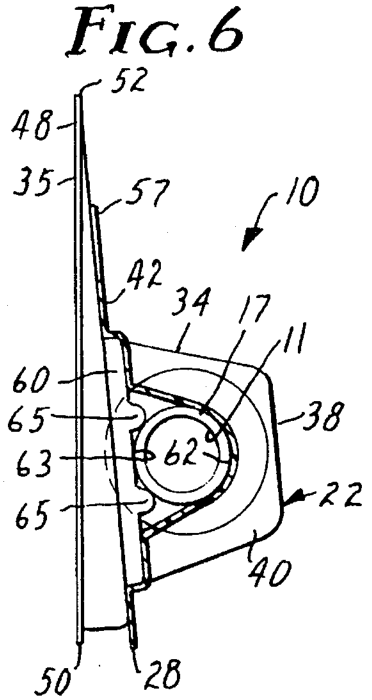
FIG. 6 is an enlarged sectional view taken approximately along lines 6—6 of FIG. 2 in which a rear portion of the dispensing assembly is not sectioned.
Figure 5:
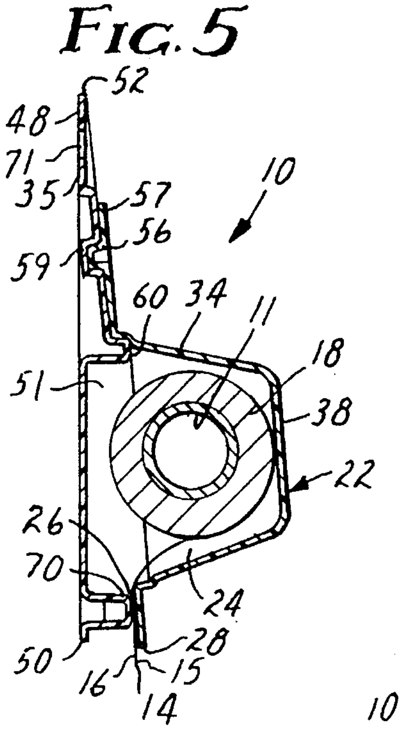
FIG. 5 is an enlarged sectional view taken approximately along lines 5—5 of FIG. 2.
Figure 4:
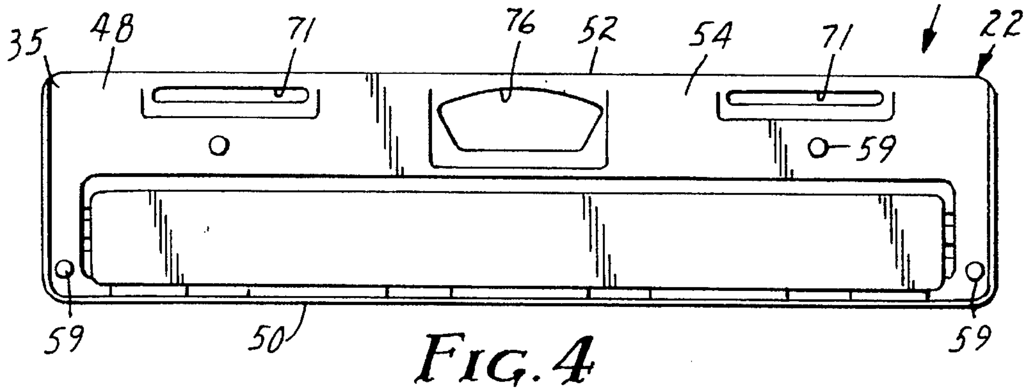
FIG. 4 is a rear view of the dispensing assembly of FIG. 1.
Figure 3:
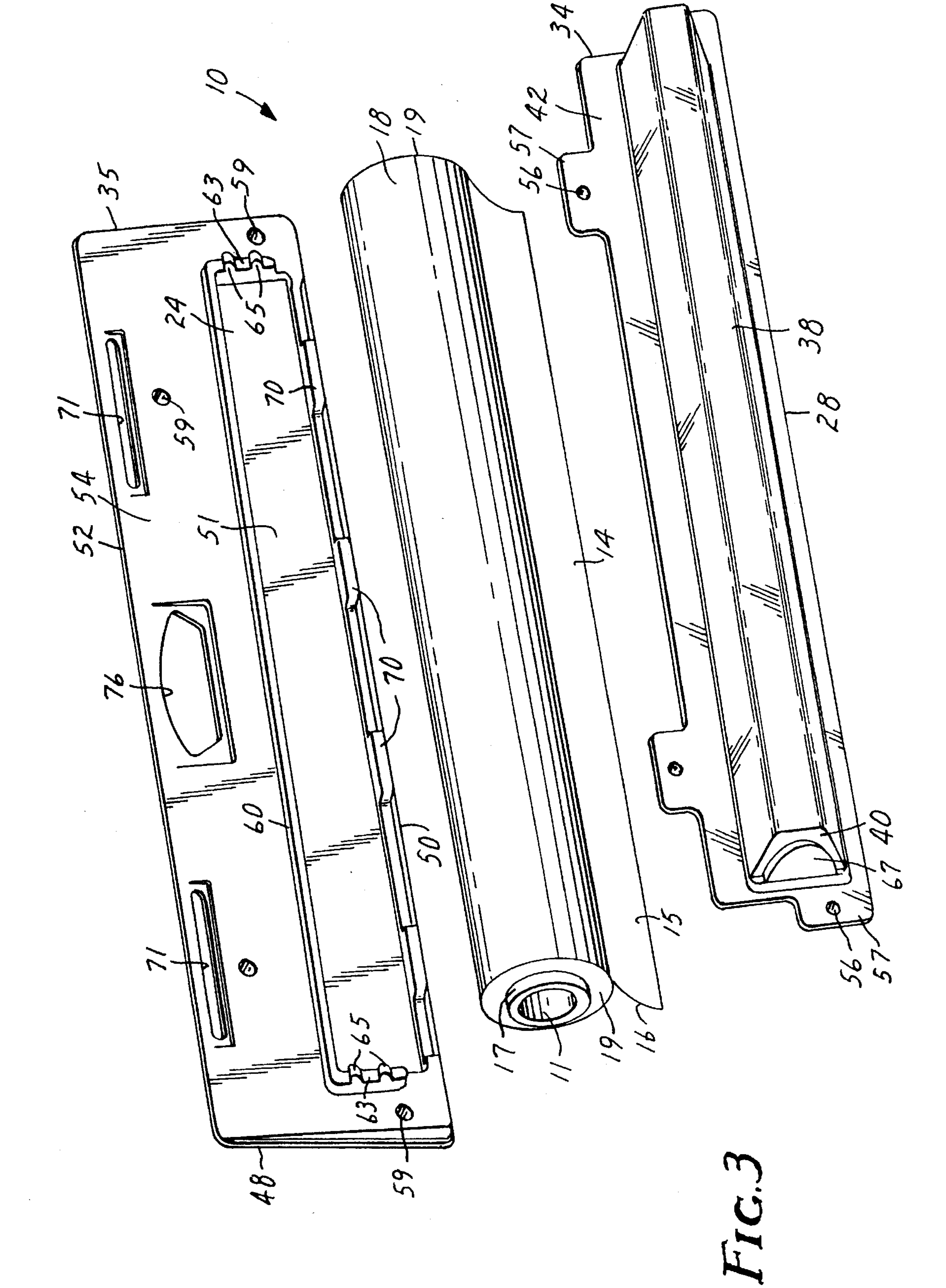
FIG. 3 is an exploded view of the dispensing assembly of FIG. 1.

The journaling means for the projecting end portions 17 of the core 11 are provided by opposed journal surface portions 62 and 63 (see FIG. 6) at each of the ends of the front and rear portions 34 and 35. Those journal surface portions 62 and 63 at each of the ends are opposed in the closed position of the front and rear portions 34 and 35 shown in FIGS. 1, 2, 5 and 6 to receive and journal the projecting end portions 17 of the core 11 when the core 11 is in the chamber 24; and those journal surface portions 62 and 63 are separated (see FIG. 3) when the front and rear portions 34 and 35 are separated to afford removal of the end portions 17 of the core 11 from between them.

The journal surface portions 63 on the rear portion 35 are partially defined by spaced projections 65 along the rim 60, whereas the journal surface portions 62 on the front portion 34 are defined by parts of arcuate inner surfaces on projecting parts 67 of the end walls 40 that also receive the spaced projections 65 when the front and rear portions 34 and 35 are in their closed position.

The first edge 50 of the rear portion 35 is partially defined by spaced recesses between projecting portions 70 of the rear wall 35, with those recesses providing finger access to the newly severed end of sheet material 14 in the opening 26 after a length of sheet material 14 has been dispensed from the dispensing assembly 10.

The attachment portion 54 of the rear wall 48 has two aligned elongate through slots 71 positioned adjacent opposite ends of the attachment portion 54 parallel to its second edge 52, which slots 71 are adapted to receive the support pegs or screws 72 on many conventional types of backboards such as the backboard 12 illustrated in FIG. 1 that can support the dispensing assembly 10. As is illustrated in FIG. 1 and is typical of many backboards, the support screws 72 threadably receive wing nuts 73 that can bear against a bar 74 that is placed over the attachment portion 54 and also receives the screws 72 in spaced openings so that the screws 72, bar 74 and wing nuts 73 clamp the attachment portion 54 to the end portion of the backboard 12.

Also, the attachment portion 54 of the rear wall 48 has a longitudinally centered elongate opening 76 generally parallel with and spaced from its second edge 52 with the part of the attachment portion 54 between the opening 76 and the second edge 52 providing a handle by which the dispensing assembly 10 can easily be moved from place to place.

The present invention has now been described with reference to one embodiment of its enclosure and three embodiments of the roll of sheet material used in the enclosure. It will be apparent to those skilled in the art that many changes can be made in the embodiments described without departing from the scope of the present invention. For example, the enclosure could be made with walls of polymeric material. The sheet material could comprise a polymeric film. The dispensing assembly would be useful for dispensing lengths of sheet material of the types described for use on surfaces other than the surfaces of backboards, such as on office or cubicle walls, and for that purpose, the slots 71 in the attachment portion 54 would not be needed. Also, the rear portion of the enclosure could be incorporated in or permanently attached to an end portion of a backboard. Thus the scope of the present invention should not be limited to the structures described in this application, but only by structures described by the language of the claims and the equivalents of those structures.

We claim:

1. A combination of structures adapted to be mounted on a backboard having opposite end portions that may be supported on an easel, said structures including:

a cylindrical core having an axis;

a length of sheet material helically wound into a roll coaxially around said core, said roll having axially spaced end surfaces and said core having opposite projecting end portions projecting axially past said end surfaces;

an enclosure including:

an elongate from portion having a first longitudinally extending edge along the periphery of said front portion, said front portion comprising walls defining an elongate outwardly project, channel part of said from portion that is generally U-shaped in transverse cross section and has opposite ends, and end walls across the ends of said channel part, said end walls and channel part defining a chamber having an open side;

an elongate rear portion comprising a rear wall having opposite ends, opposite first and second longitudinally extending edges along the periphery of said rear portion extending between said ends, and an attachment part along said second edge including means adapted to be releasably mounted on support members on one end portion of a said backboard; and means for mounting and releasably retaining said front portion on said rear portion in a closed position with said rear portion extending across the open side of said chamber and for affording manual separation of said rear portion from the open side of said channel;

said front and rear portions each including a journal surface portion at each of said ends, said journal surface portions at said ends of said front portion being opposed to the journal surface portions at the ends of said rear portion in the closed position of said front and rear portions to define sockets at said ends that receive and journal the projecting end portions of said core with said roll in said chamber, and said journal surface portions being separated when said rear portion is separated from the open side of said channel to afford removal of said projecting end portions of said core from between said journal surface portions;

said first edges of said walls being spaced to define an elongate opening parallel to said axis through which lengths of sheet material from said roll can be pulled from said roll when said from and rear portions are in said closed position; and said enclosure further including cutting means on said first edge of said front portion along said opening for affording cutting a dispensed length of sheet material projecting through said opening from sheet material on said roll by pulling said dispensed length of sheet material into engagement with said cutting means.

2. A combination of structures according to claim 1 wherein said front portion is formed of transparent polymeric material to afford visual inspection of the amount of sheet material remaining on the roll.

3. A combination of structures according to claim 1 wherein said front and rear portions are formed of polymeric material, said front portion includes a flange wall around the open side of said channel positioned face to face with said rear wall when said front and rear portions are in said closed position, and said means for removably mounting and releasably retaining said front portion on said rear portion in said closed position and for affording manual separation of said rear portion from the open side of said channel comprises a plurality of projections from one of said portions frictionally received in sockets in the other of said portions.

4. A combination of structures according to claim 1 wherein said length of sheet material has front and rear surfaces, said length of sheet material is helically wound with said front surface outermost in said roll; and said assembly includes spaced strips of repositionable pressure sensitive adhesive extending longitudinally along the rear surface of said length of sheet material and spaced transversely of said length of sheet material.

5. A combination of structures according to claim 4 wherein said length of sheet material comprises a paper sheet, an adhesive primer on said rear surface, and a coating of release material on said front surface, said coating of release agent on said front surface causing a very low release force from the strips of adhesive when the sheet material in the roll is unwound, while allowing the front surface of the sheet material to be easily written on with solvent base and water base writing fluids, said coating of release material on said front surface and said coating of adhesive primer on said rear surface restricting bleeding of solvent base writing fluids through the sheet material while the front surface of said sheet material is being written on by pens using such writing fluids.

6. A combination of structures according to claim 1 wherein said attachment part has a longitudinally centered elongate opening generally parallel with and spaced from the second edge of said rear wall with a section of the attachment part between the opening and said second edge providing a handle by which the dispensing assembly can easily be moved from place to place, and said attachment part has two aligned parallel elongate through slots positioned adjacent opposite ends of the attachment part generally parallel to the second edge of the rear wall and adapted to receive the support members on some types of easels by which the dispensing assembly might be attached to a backboard.

7. A combination of structures according to claim 5 wherein said length of sheet material is at least about 18 inches wide; and said strips of repositionable pressure sensitive adhesive are firmly adhered along the primed rear surface of said length of sheet material and are adherable to most vertical surfaces encountered in the office environment to support a length of the sheet material, while being subsequently cleanly removable from those vertical surfaces.

8. An enclosure adapted to be mounted on a backboard having opposite end portions that may be supported on an easel, which enclosure is adapted for use with a cylindrical core having an axis, and a length of sheet material helically wound into a roll coaxially around the core, the roll having axially spaced end surfaces and the core having opposite projecting end portions projecting axially past said end surfaces; said enclosure including:

an elongate front portion having a first longitudinally extending edge along the periphery of said front portion, said front portion comprising walls defining an elongate outwardly projecting, channel part of said front portion that is generally U-shaped in transverse cross section and has opposite ends, and end walls across the ends of said channel part, said end walls and channel part defining a chamber having an open side;

an elongate rear portion comprising a rear wall having opposite ends, opposite first and second longitudinally extending edges along the periphery of said rear portion extending between said ends, and an attachment part along said second edge including means adapted to be releasably mounted on support members on one end portion of a said backboard; and means for mounting and releasably retaining said front portion on said rear portion in a closed position with said rear portion extending across the open side of said chamber and for affording manual separation of said rear portion from the open side of said chamber;

said front and rear portions each including a journal surface portion at each of said ends, said journal surface portions at said ends of said front portion being opposed to the journal surface portions at the ends of said rear portion in the closed position of said front and rear portions to define sockets at said ends that are adapted to receive and journal the projecting end portions of the core with the roll in said chamber, and said journal surface portions being separated when said rear portion is separated from the open side of said channel to afford removal of said projecting end portions of the core from between said journal surface portions;

said first edges of said walls being spaced to define an elongate opening parallel to said axis through which lengths of sheet material from said roll can be pulled from said roll when said front and rear portions are in said closed position; and said enclosure further including cutting means on said first edge of said front portion along said opening adapted to affording cutting a dispensed length of sheet material projecting through said opening from sheet material on the roll by pulling the dispensed length of sheet material into engagement with said cutting means.

9. An enclosure according to claim 8 wherein said front portion is formed of transparent polymeric material to afford visual inspection of the amount of sheet material remaining on the roll.

10. An enclosure according to claim 8 wherein said front and rear portions are formed of polymeric material, said front portion includes a flange wall around the open side of said channel positioned face to face with said rear wall when said front and rear portions are in said closed position, and said means for removably mounting and releasably retaining said front portion on said rear portion in said closed position and for affording manual separation of said rear portion from the open side of said channel comprises a plurality of projections from one of said portions frictionally received in sockets in the other of said portions.

11. An enclosure according to claim 8 wherein said attachment part has a longitudinally centered elongate opening generally parallel with and spaced from the second edge of said rear wall with a section of the attachment part between the opening and said second edge providing a handle by which the dispensing assembly can easily be moved from place to place, and said attachment part has two aligned parallel elongate through slots positioned adjacent opposite ends of the attachment part generally parallel to the second edge of the rear wall and adapted to receive the support members on some types of easels by which the dispensing assembly might be attached to a backboard.

* * * * *

UNITED STATES PATENT AND TRADEMARK OFFICE
CERTIFICATE OF CORRECTION

PATENT NO.: 5,565,253

DATED: October 15, 1996

INVENTOR(S): Crawford et al.

It is certified that error appears in the above-identified patent and that said Letters Patent is hereby corrected as shown below:

Col. 6, line 49, "from portion" should read --front portion--.

Col. 6, line 52, "project, channel" should read --projecting channel--.

Col. 6, line 53, "from portion" should read --front portion--.

Col. 7, line 20, "from and rear" should read --front and rear--.

Col. 8, line 31, "projecting, channel" should read --projecting channel--.

Signed and Sealed this

Twentieth Day of October, 1998

Attest:

BRUCE LEHMAN

*Attesting Officer* *Commissioner of Patents and Trademarks*